United States Patent
Suraparaju

(10) Patent No.: US 11,140,146 B2
(45) Date of Patent: Oct. 5, 2021

(54) METHOD AND SYSTEM FOR SEAMLESS SINGLE SIGN-ON (SSO) FOR NATIVE MOBILE-APPLICATION INITIATED OPEN-ID CONNECT (OIDC) AND SECURITY ASSERTION MARKUP LANGUAGE (SAML) FLOWS

(71) Applicant: Konica Minolta Laboratory U.S.A., Inc., San Mateo, CA (US)

(72) Inventor: Rahul Suraparaju, Fremont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 279 days.

(21) Appl. No.: 16/233,998

(22) Filed: Dec. 27, 2018

(65) Prior Publication Data

US 2020/0213297 A1   Jul. 2, 2020

(51) Int. Cl.
   *H04L 29/06* (2006.01)

(52) U.S. Cl.
   CPC ...... *H04L 63/0815* (2013.01); *H04L 63/0876* (2013.01); *H04L 63/0892* (2013.01)

(58) Field of Classification Search
   CPC ............ H04L 63/0815; H04L 63/0876; H04L 63/0892; H04L 63/10; G06F 21/44; G06F 21/445; H04W 12/06; H04W 12/062; H04W 12/065; H04W 12/08; H04W 12/084

See application file for complete search history.

(56) References Cited

U.S. PATENT DOCUMENTS

| | | | | |
|---|---|---|---|---|
| 6,826,696 | B1 * | 11/2004 | Chawla | H04L 63/0815 713/168 |
| 7,500,262 | B1 * | 3/2009 | Sanin | G06Q 20/3674 726/2 |
| 8,745,718 | B1 | 6/2014 | Dufel et al. | |
| 8,893,293 | B1 * | 11/2014 | Schmoyer | H04L 63/08 726/26 |
| 9,503,452 | B1 * | 11/2016 | Kumar | H04L 67/306 |

(Continued)

OTHER PUBLICATIONS

The extended European Search Report dated May 13, 2020, by the European Patent Office in corresponding European Application No. 19207679.2. (7 pages).

*Primary Examiner* — Malcolm Cribbs
(74) *Attorney, Agent, or Firm* — Buchanan Ingersoll & Rooney PC

(57) ABSTRACT

A method, a non-transitory computer readable medium, and a mobile device are disclosed for accessing a resource hosted on a relying party server from a mobile device. The method includes: hosting a native application on the mobile device, the native mobile device having a user agent for pre-authenticated users; receiving a redirection request from an authentication server for an authentication token for a pre-authenticated user in response to a request for the resource hosted on the relying party server; sending the authentication token for the pre-authenticated user from the user agent of the mobile device to the authentication server in response to the redirection request form the authentication server; and authenticating the authentication token from the user agent on the authentication server and generating an authentication cookie for the authenticated user to access the resource on the relying party server.

20 Claims, 8 Drawing Sheets

(56) References Cited

U.S. PATENT DOCUMENTS

| | | | |
|---|---|---|---|
| 2005/0204148 A1* | 9/2005 | Mayo | H04L 63/0815 713/185 |
| 2011/0264913 A1* | 10/2011 | Nikander | H04L 63/0815 713/168 |
| 2013/0007846 A1* | 1/2013 | Murakami | H04W 12/04031 726/4 |
| 2013/0031612 A1* | 1/2013 | Funayama | H04L 63/10 726/4 |
| 2014/0082366 A1* | 3/2014 | Engler | H04L 9/3242 713/176 |
| 2015/0143453 A1* | 5/2015 | Erb | H04L 63/10 726/1 |
| 2016/0127352 A1* | 5/2016 | Xu | H04L 63/0815 726/8 |
| 2016/0134616 A1* | 5/2016 | Koushik | H04L 63/08 726/9 |
| 2017/0353444 A1* | 12/2017 | Karangutkar | H04W 12/0602 |
| 2018/0077144 A1* | 3/2018 | Gangawane | H04L 63/10 |
| 2018/0081983 A1* | 3/2018 | Carru | H04L 63/0815 |
| 2018/0191701 A1* | 7/2018 | Kong | H04L 63/083 |
| 2018/0337784 A1* | 11/2018 | Jain | H04L 9/3213 |
| 2018/0343256 A1* | 11/2018 | Boodaei | H04L 63/0807 |
| 2019/0097994 A1* | 3/2019 | Mathew | H04L 63/0815 |

* cited by examiner

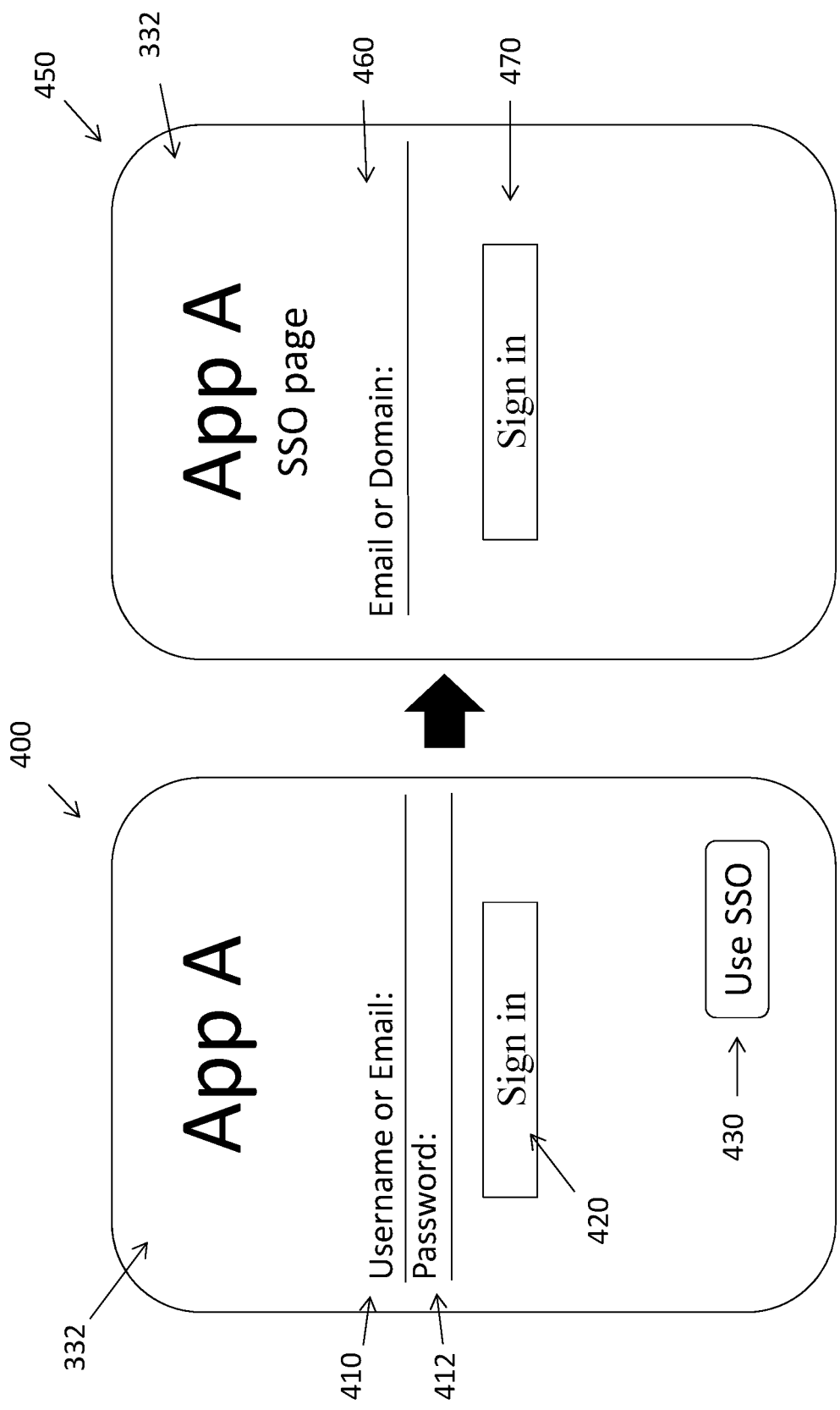

METHOD AND SYSTEM FOR SEAMLESS SINGLE SIGN-ON (SSO) FOR NATIVE MOBILE-APPLICATION INITIATED OPEN-ID CONNECT (OIDC) AND SECURITY ASSERTION MARKUP LANGUAGE (SAML) FLOWS

FIELD OF THE INVENTION

The present disclosure generally relates to computer networking systems and methods for seamless single sign-on (SSO) for native mobile-application initiated OpenID connect (OIDC) and Security Assertion Markup Language (SAML) flows.

BACKGROUND OF THE INVENTION

OpenID Connect (OIDC) 1.0 is a simple identity layer on top of the OAuth 2.0 protocol OpenID Connect allows clients to verify the identity of the end-user based on the authentication performed by an authorization server, as well as to obtain basic profile information about the end-user in an interoperable and REST-like manner (Representational State Transfer-like manner).

Security Assertion Markup Language (SAML) is an XML standard for exchanging single sign-on information between an SAML Federation Identity Provider (IdP) who asserts the user identity and a SAML Federation Service Provider (SP) who consumes the user identity information.

While both of these technologies are used as single sign-on (SSO) solutions, OIDC and SAML completely leave it to the authentication providers to determine the process of how the user is authenticated. Several authentication providers that support these Open Standards for SSO, have their own methods or processes for "authenticating the user", the output/result of which is one important step during all OIDC and SAML flows since in this phase of OIDC flow, the authentication code ("Auth Code") is produced by an authentication provider and provided to the OIDC Relying Party, and in case of SAML flow the SAML Assertion is constructed and sent to SAML-Relying Party (SP).

Single sign-on (SSO) is an authentication process that allows a user to access multiple applications with one set of login credentials. Single sign-on, for example, is a common procedure in enterprises, where a client accesses multiple resources connected to a local area network (LAN).

SUMMARY OF THE INVENTION

In consideration of the above issues, it would be desirable to have a method that enables OIDC and SAML flows that are initiated as a result of Login action from a mobile application (e.g., a native application) on a mobile device via a single sign-on (SSO) and wherein the user is not interfered by the system for authentication since the user has already been authenticated.

A method is disclosed for accessing a resource hosted on a relying party server from a mobile device, the method comprising: hosting a native application on the mobile device, the native mobile device having a user agent for pre-authenticated users; receiving a redirection request from an authentication server for an authentication token for a pre-authenticated user in response to a request for the resource hosted on the relying party server; sending the authentication token for the pre-authenticated user from the user agent of the mobile device to the authentication server in response to the redirection request form the authentication server; authenticating the authentication token from the user agent on the authentication server and generating an authentication cookie for the authenticated user to access the resource on the relying party server; sending the authentication cookie the mobile device; and granting access to the pre-authenticated user to the resource hosted on the relying party server upon receipt of the authentication cookie by the relying party server.

A non-transitory computer readable medium storing computer readable program code executed by a processor for accessing a resource hosted on a relying party server from a mobile device, the process comprising: hosting a native application on the mobile device, the native mobile device having a user agent for pre-authenticated users; receiving a redirection request from an authentication server for an authentication token for a pre-authenticated user in response to a request for the resource hosted on the relying party server; sending the authentication token for the pre-authenticated user from the user agent of the mobile device to the authentication server in response to the redirection request form the authentication server; authenticating the authentication token from the user agent on the authentication server and generating an authentication cookie for the authenticated user to access the resource on the relying party server; sending the authentication cookie the mobile device; and granting access to the pre-authenticated user to the resource hosted on the relying party server upon receipt of the authentication cookie by the relying party server.

A mobile device having a native application for accessing a resource hosted on a relying party server from the mobile device, the mobile device comprising: a processor; a user interface; and a memory having an operating system and a user agent having authentication tokens for pre-authenticated users, the operating system and the user agent configured to: receive a redirection request from an authentication server for an authentication token for a pre-authenticated user in response to a request for the resource hosted on the relying party server; send the authentication token for the pre-authenticated user from the user agent of the mobile device to the authentication server in response to the redirection request form the authentication server; receive an authentication cookie generated from the authentication of the authentication token from the user agent on the authentication server, the authentication cookie configured to grant the authenticated user access to the resource on the relying party server; and access the resource hosted on the relying party server with the authentication cookie.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A is an illustration of the display unit or user interface of the mobile device as shown in FIG. 3B.

FIG. 4B is an illustration of the display unit or user interface of the mobile device as shown in FIG. 3B.

DETAILED DESCRIPTION

Figure 1:
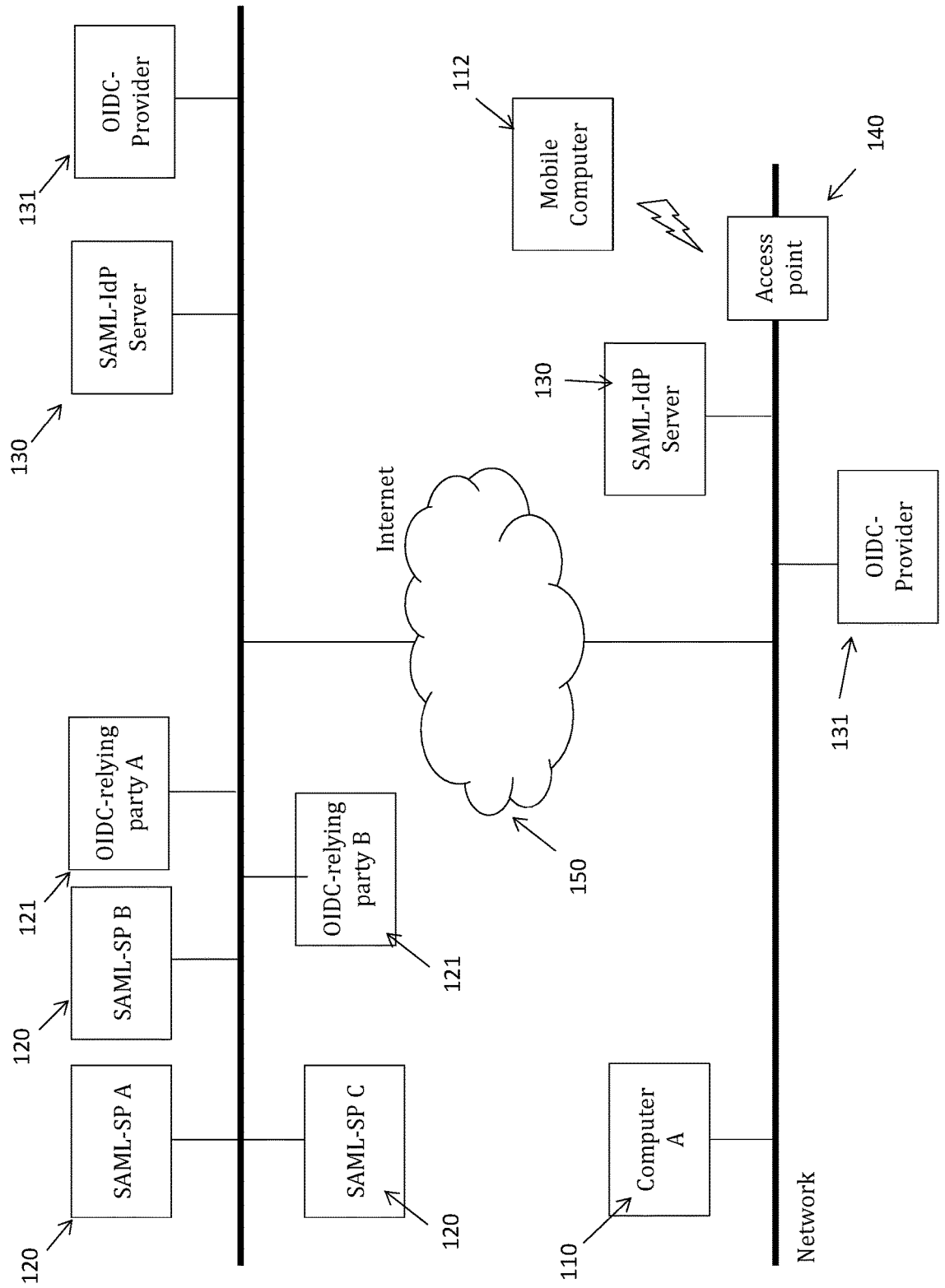
FIG. 1 is an illustration of a system having seamless single sign-on (SSO) for native mobile-application triggered OpenID connect (OIDC) and Security Assertion Markup Language (SAML) flows.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 having seamless single sign-on (SSO) for native mobile-application triggered OpenID connect (OIDC) and Security Assertion Markup Language (SAML) flows. As shown in FIG. 1, the system 100 can include a computer or client device 110, at least one mobile computer 112, one or more SAML-SP relying servers (SAML-SP A, SAML-SP B, SAML-SP C) 120, one or more OIDC-relying party servers (OIDC relying party A, OIDC relying party B) 121, one or more SAML-IdP servers 130, and one or more OIDC provider servers 131. In accordance with an exemplary embodiment, the computer or client device 110, the at least one mobile computer 112, the one or more SAML-SP relying servers 120, the one or more OIDC-relying party servers 121, the one or more SAML-IdP servers 130, and the one or more OIDC provider servers 131 can be connected via a communication network 150. In accordance with an exemplary embodiment, the communication network or network 150 can be a public telecommunication line and/or a network (for example, LAN or WAN). Examples of the communication network 150 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In addition, for example, an access point 140 can communicate with the communication network 150 to provide wireless or cellular data communication between the mobile computer (for example, a smart phone) 112, and the communication network 150. In accordance with an exemplary embodiment, the access point 140 can be any networking hardware device that allows a Wi-Fi device to connect to a wired network, or a hardware device that can allow a cellular device, for example, the mobile computer (or smartphone) 112 to connect to the wired network 150.

OpenID Connect (OIDC) is an identity layer on top of an OAuth 2.0 protocol, which allows computing clients to verify the identity of an end-user based on the authentication performed by an authorization server, as well as to obtain basic profile information about the end-user in an interoperable and REST-like manner. In technical terms, OpenID Connect specifies a RESTful (Representational State Transfer), HTTP (hypertext transfer protocol), and API (application program interface), using JSON (JavaScript Objection Notation) as a data format. OpenID Connect, for example, allows a range of clients, including Web-based, mobile, and JavaScript clients, to request and receive information about authenticated sessions and end-users. The specification suite can also support optional features such as encryption of identity data, discovery of OpenID Providers, and session management.

As shown in FIG. 1, for example, an authentication code can be produced by one or more OIDC-Providers 131 (e.g., an authentication provider), which authentication code is then provided to the one or more OIDC-relying party servers 121. In accordance with an exemplary embodiment, the one or more OIDC-relying party servers 121 can be servers configured to provide, for example, client access to one or more secure software applications as disclosed herein.

Security Assertion Markup Language (SAML) is an XML standard for exchanging single sign-on (SSO) information between an SAML Federation Identity Provider (SAML-IdP) who asserts the user identity and a SAML Federation Service Provider (SAML-SP) who consumes the user identity information. SAMLv2.0 (Security Assertion Markup Language version 2) supports IDP-initiated and SP-initiated flows. In IdP-initiated SAML SSO flow, the SAML-IdP creates a SAML single sign-on assertion for the user identity, and sends the SAML single sign-on assertion to the SP (Service Provider) 120 in an unsolicited fashion. In SP-Initiated SAML SSO flow, the SP generates a SAML2.0 AuthnRequest (e.g., Authentication Request), which is sent to the SAML-IdP 130 as the first step in the Federation process and the SAML-IdP then responds with a SAML Response, both of these interactions being asynchronous to each other.

In accordance with an exemplary embodiment, the SAML-IdP is a system entity that issues authentication assertions in conjunction with a single sign-on (SSO) profile of the Security Assertion Markup Language (SAML). In the SAML domain model, a SAML authority is any system entity that issues SAML assertions. Two important examples of SAML authorities are the authentication authority and the attribute authority.

In accordance with an exemplary embodiment, the plurality of SAML-SP servers 120 are configured to receive and accept authentication assertions in conjunction with a single sign-on (SSO) profile of the Security Assertion Markup Language. In the SAML domain model, the SAML-SP servers 120 (e.g., SAML relying party) is any system entity that receives and accepts information form another system entity. Of particular interest is a SAML relying party that receives and accepts a SAML assertion issued by a SAML authority. An important type of SAML authority is the SAML Identity Provider, a system entity that issues authentication assertions in conjunction with an SSO profile of SAML. A relying party that consumes such assertions is called a SAML service provider (or simply service provider if the domain is understood). Thus, a SAML service provider (SAML-SP) is a system entity that receives and accepts an authentication assertion issued by a SAML Identity Provider (SAML-IdP).

In accordance with an exemplary embodiment, the one or more SAML-SP relying servers 120 and/or the one or more OIDC-relying party servers 121 can be any entity that provides organizations with enterprise servers, for example, consulting, legal, real estate, communications, storage, processing. For example, the one or more SAML-SP relying servers 120 and/or the one or more OIDC-relying party servers 121 can be a third party or outsource supplier, for example, telecommunication service providers (TSPs), application service providers (ASPs), storages service providers (SSPs) and internet service providers (ISPs).

For example, a TSP is a type of communication service provider that has traditionally provided telephone and similar services, which can include incumbent local exchange carriers, competitive local exchange carriers, and mobile wireless communication companies. An ASP is a business providing computer-based services to customers over a network. For example, an ASP can provide access to a particular software application (such as customer relationship management) using a standard protocol, for example, such as HTTP. A SSP is any company that provides computer storage space and related management services, periodic backup, and archiving.

Figure 2:
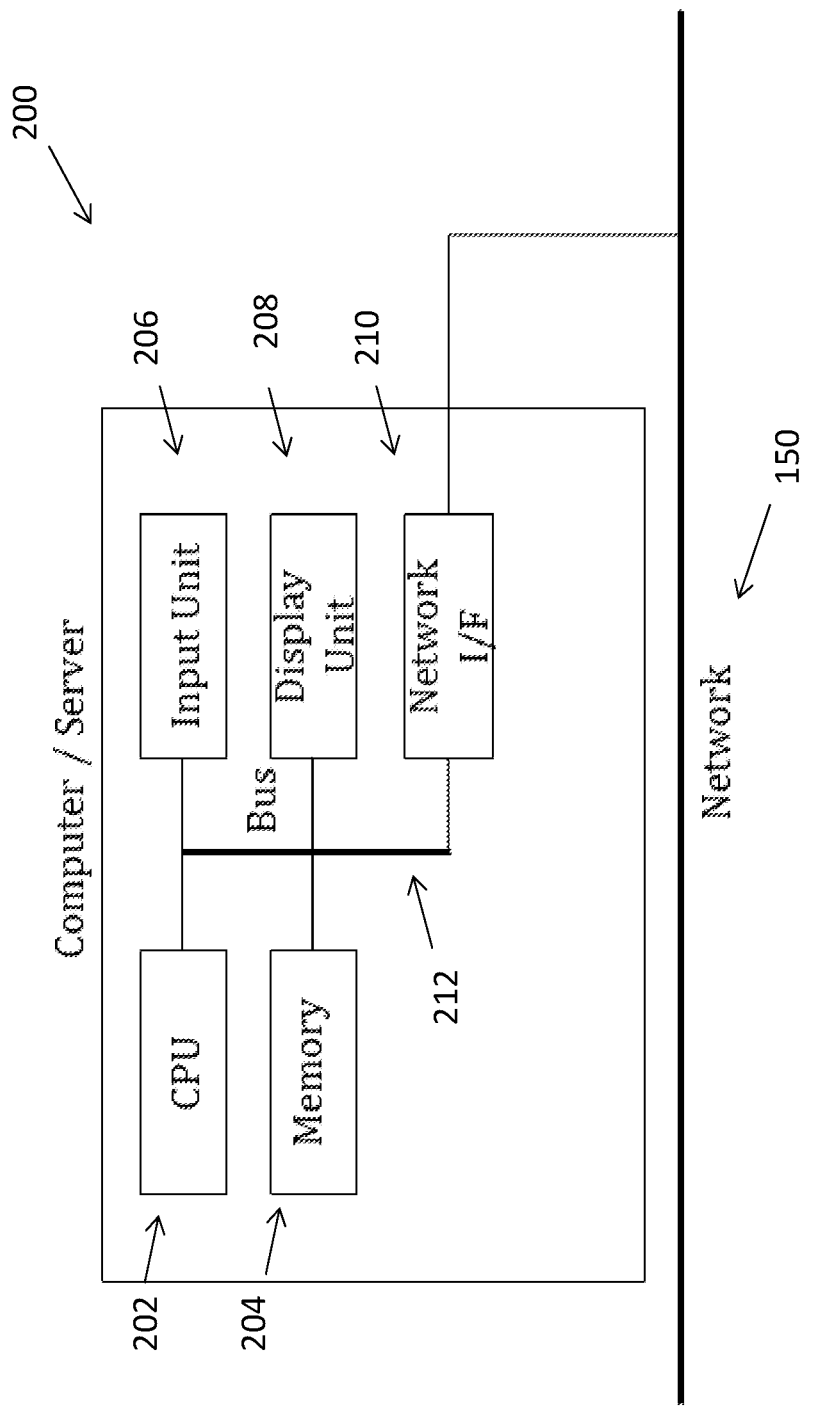
FIG. 2 is an illustration of a computer or a server in accordance with an exemplary embodiment.

FIG. 2 is an illustration of a computing device 200, which can be a computer 110, a mobile computer 112, a SAML-SP server (or SAML-SP relying server) 120, an ODIC-relying party server 121, a SAML-IdP server 130, or an OIDC-Provider server 131. As shown in FIG. 2, the exemplary computing device 200 can include a processor or central processing unit (CPU) 202, and one or more memories 204 for storing software programs and data. The processor or CPU 202 carries out the instructions of a computer program, which operates and/or controls at least a portion of the functionality of the computing device 200. The computing device 200 can also include an input unit 206, a display unit or graphical user interface (GUI) 208, and a network interface (I/F) 210, which is connected to a communication network (or network) 150. A bus 212 can connect the various components 202, 204, 206, 208, 210 within the computing device 200.

In accordance with an exemplary embodiment, the computing device 200 can include a display unit or graphical user interface (GUI) 208, which can access, for example, a web browser (not shown) in the memory 204 of the computing device 200. The computing device 200 also includes an operating system (OS), which manages the computer hardware and provides common services for efficient execution of various software programs. In accordance with an exemplary embodiment, the OS of the CPU 202 is a Linux or Windows® based operating system. The software programs can include, for example, application software and printer driver software. For example, the printer driver software controls a multifunction printer or printer (not shown), for example connected with the computing device 200 in which the printer driver software is installed via the communication network 150. In certain embodiments, the printer driver software can produce a print job and/or document based on an image and/or document data.

Figures 3A, 3B:
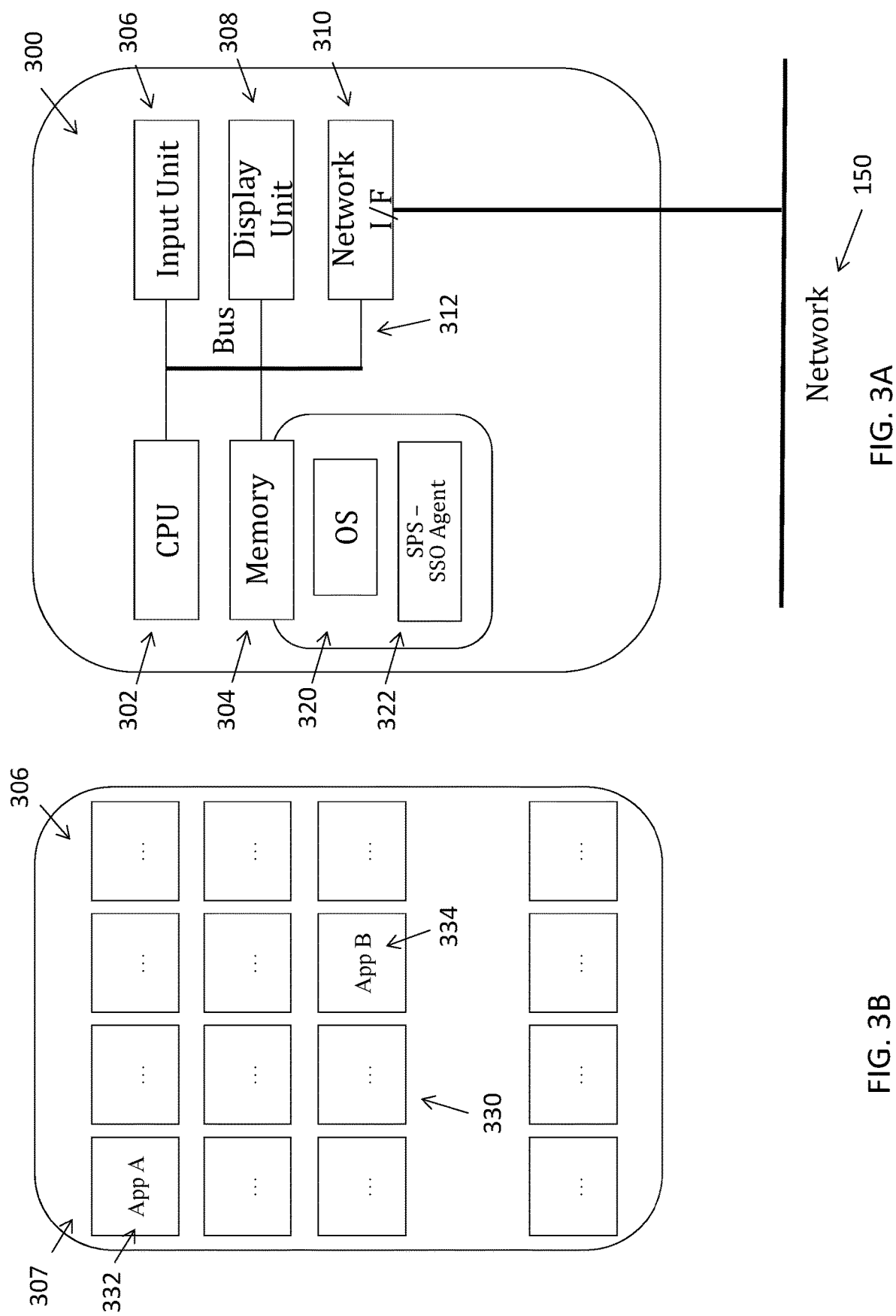
FIG. 3A is an illustration of a mobile device in accordance with an exemplary embodiment.
FIG. 3B is an illustration of a display unit or user interface of a mobile device in accordance with an exemplary embodiment.

FIG. 3A is an illustration of a mobile device 300 in accordance with an exemplary embodiment. As shown in FIG. 3A, the exemplary mobile device 300 can include a processor or central processing unit (CPU) 302, and one or more memories 304 for storing software programs and data, an operating system 320, and an SPS-SSO agent 322. In accordance with an exemplary embodiment, the memory 304 includes the SPS-SSO agent 322, wherein the SPS-SSI agent 332 is configured to perform one or more the processes for enabling OIDC and SAML flows on a mobile application on the mobile device 300 via single sign-on (330) protocol. The processor or CPU 302 carries out the instructions of a computer program, which operates and/or controls at least a portion of the functionality of the mobile device 300. The mobile device 300 can also include an input unit 306, a display unit or graphical user interface (GUI) 308, and a network interface (I/F) 310, which is connected to a communication network (or network) 150. A bus 312 can connect the various components 302, 304, 306, 08, 310 within the mobile device 300.

In accordance with an exemplary embodiment, the mobile device 300 can include a display unit or graphical user interface (GUI) 308, which can access, for example, a web browser (not shown) in the memory 304 of the mobile device 300. The mobile device 300 also includes the operating system (OS) 320, which manages the computer hardware and provides common services for efficient execution of various software programs. In accordance with an exemplary embodiment, the OS 320 of the mobile device 300 is a Linux or Windows® based operating system. The software programs can include, for example, application software and printer driver software. For example, the printer driver software controls a multifunction printer or printer (not shown), for example connected with the mobile device 300 in which the printer driver software is installed via the communication network 150. In certain embodiments, the printer driver software can produce a print job and/or document based on an image and/or document data In accordance with an exemplary embodiment, the mobile device 300 can also preferably include an authentication module, which authenticates a user, for example, by fingerprint recognition or authentication, or other authentication protocol, which are currently implemented or will be implemented on mobile devices. For example, a password authentication protocol, which uses credentials, such as username and password can be used. In accordance with an exemplary embodiment, the authentication module can be for access to the mobile device 300 and/or used in connection with a single sign-on (SSO) process as disclosed herein.

FIG. 3B is an illustration of a display unit or user interface (also known as a graphical user interface (GUI) 306 of a mobile device 300 in accordance with an exemplary embodiment. As shown in FIG. 3B, the display unit or user interface 306 can be a touch screen (or touch pad) 307 having a plurality of icons 330 for frequently used applications, for example, a telephone module, an e-mail client module, a browser module, a video and music player module, a messages module, a calendar, a camera module, maps, weather, and application or module, which provides access to settings for mobile device 300 and various applications. In accordance with an exemplary embodiment, the display unit or user interface 306 also includes, for example, an icon 332 ("App A") for an application for SSO login through OIDC, and an icon 334 ("App B") for an application for SSO login through SAML.

FIG. 4A is an illustration of the display unit or user interface 400 of the mobile device 300 as shown in FIG. 3B. As shown in FIG. 4A, upon selection of the icon 332 ("App A") by touch or other known methods on the user interface 400 of the mobile device 300, the user interface 400 displays present to the user a request, for example, for "Username or Email" 410 and "Password" 412". In addition, the display unit or user interface 400 presents the user with icons that provide for "Sign in" 420, or alternatively, an icon for "Use SSO" 430, which will prompt the user with the user interface 450 as shown in FIG. 4B.

FIG. 4B is an illustration of the display unit or user interface 450 of the mobile device 300 as shown in FIG. 3B for SSO sign in. As shown in FIG. 4B, the SSO page requests, for example, "Email or Domain" 460, and includes a "Sign in" icon 470.

In accordance with an exemplary embodiment, a method and system are disclosed for single sign-on (SSO) for native mobile-application initiated for OpenID connect (OIDC)

and Security Assertion Markup Language (SAML) flows on a mobile device 112 of the user, the method and system as disclosed herein, introduces an application (for example, a mobile application (or software component), which acts as an agent/proxy for pre-authentication purposes, between the user (e.g., client device or mobile device 112) and an authentication provider (for example, a SAML-IDP server 130 or an OIDC-Provider server 131). In accordance with an exemplary embodiment, the mobile application (or software component) is an interlace 332, 334 on the mobile device 112 in which the user is authenticated before the user can avail (or access) any services from, for example, on premises software (for example, On Premises Legacy) and/or off premises software (for example, Cloud services). In accordance with an exemplary embodiment, the authentication of the user via a single sign-on (SSO) method (or protocol) can be done, for example, via biometrics, such as finger print, facial identification or facial recognition, iris detection, and/or username and PIN (personal identification number). The mobile application as disclosed herein can contain, for example, a JSON Web Token (JWT) on behalf of user at the end of a successful authentication.

In accordance with an exemplary embodiment, the mobile device 112 can include an application, for example, in the form of an agent code software component, that continuously awaits for redirection request from the authentication provider (for example, the OIDC-Provider (or OIDC-OP) 131 or the SAML-IdP Server 130) and submits a current active JSON Web Token (JWT) corresponding to the pre-authenticated user (i.e., uniquely identifies a user) via response to a processed redirection request.

In accordance with an exemplary embodiment, the redirection from the OIDC-OP 131 or SAML-IdP 130 to the agent running on the corresponding authentication solutions mobile application 322 can be in addition to a regular OIDC/SAML flow. In accordance with an exemplary embodiment, for example, the additional redirection visit to the designated and registered mobile application can steal the original flow (e.g., the flow started by native mobile application) so that the context is not lost. In accordance with an exemplary embodiment, the goal of the flow can be to avoid prompting user for querying to submit any authentication details, as the flow starts from the mobile application, which does not have any context on a pre-authenticated user.

In accordance with an exemplary embodiment, the authentication provider (SAML-IdP 130 or OIDC-OP 131) steals the flow to query the agent on the mobile application counterpart, only when the authentication provider ((SAML-IdP 130 or OIDC-OP 131) detects the user agents (UAs), where the flow is originated. For example, supported mobile user agents can include Apple® WebKit, Mobile Safari, and 537.36 (KHTML, like Gecko) Chrome. In addition, the user agents by mobile browsers can vary depending on the browser version, device model, operating system (OS), and other factors.

In accordance with an exemplary embodiment, on the Authentication Provider (SAML-IdP 130 or OIDC Provider 131), the OIDC "Auth" flow that hits "Auth" end point or SAML's "Authentication Request" flow can go on a temporary pending state, as the flow takes modification disclosed above and additional redirection takes place, to retrieve the JWT token generated earlier by the authentication provider for the user.

After the authentication provider receives the JWT token via response to the query redirect of the authentication provider, the authentication provider validates the token and generates a domain cookie, resumes the halted OIDC or SAML flow, and sets the generated cookie (i.e., a Set-Cookie HTTP response header) when the authentication response is sent back. In accordance with an exemplary embodiment, further communication will use the domain cookie being set on the native mobile application (where the original OIDC flow and SAML flow is originated) user agent.

In accordance with an exemplary embodiment, a variety of native applications for mobile devices exist with respect to which UI-rendering technologies use towards the application login-flow. For example, some application launch an external browser, some applications use an in-app browser such as WebView, and others applications use latest trends such as SFSafariViewController and ChromeTab. In accordance with an exemplary embodiment, three examples are disclosed to convey that the agent code reoffered in the present disclosure is a user-agent agnostic (i.e., compatible with many types of platforms or operating system), based on the agent's behavior to achieve the end goal of providing seam lessness to SSO flows for OIDC and SAML in Native Mobile Applications, for example, Google Drive and Box, which support Single Sign-On (SSO) based login flow and corresponding redirect behavior on the agent.

In accordance with an exemplary embodiment, for example, applications using system browsers, such as Safari or Chrome, the system browsers act as a different application that has their own user agent. In accordance with an exemplary embodiment, the agent receives the redirect request, decrypts the encrypted URI parameter to verify the encrypted URI came from the genuine authentication provider. This verification is to avoid malicious applications and the server tries to query the agent to get the JWT (i.e., token) of the user. If successful, the server redirects the user agent to hit the authentication server and provides the JWT. If not successful, the request is dropped, log the messages is logged, and an ALERT message, for example, a pop-up can be used to alert the application user to report the issue with an administrator.

In accordance with an exemplary embodiment, for example, applications using Web View Component such as WKWebView, each WebView is sandboxed and the browser appears inside application content (user never leaves application). In accordance with an exemplary embodiment, the agent receives the redirect request, decrypts the encrypted URI parameter to verify it really came from the genuine authentication provider. This verification is to avoid malicious applications and the server tries to query the agent to get the JWT (i.e., token) of the user. If successful, redirects the user agent to hit the authentication server and provides the JWT. If not successful, the request is dropped, the messages are logged, and an ALERT message, for example, a pop-up can be used to alert the application user to report the issue with an administrator.

In accordance with an exemplary embodiment, for example, for applications using SFSafariViewController (IOS) or ChromeTab, the browser appears inside the application content (i.e., the user never leaves the application). In accordance with an exemplary embodiment, the agent receives the redirect request, decrypts the encrypted URI parameter to verify the encrypted URI parameter came from the genuine authentication provider. This verification is to avoid malicious applications and the server tries to query the agent to get JWT (i.e., token) of the user. If successful, the redirects the user agent to hit the authentication server and provides the JWT. If not successful, the request is dropped, the messages are logged, and an ALERT message, for example, a pop-up can be used to alert the application user to report the issue with an administrator.

Figure 5A:
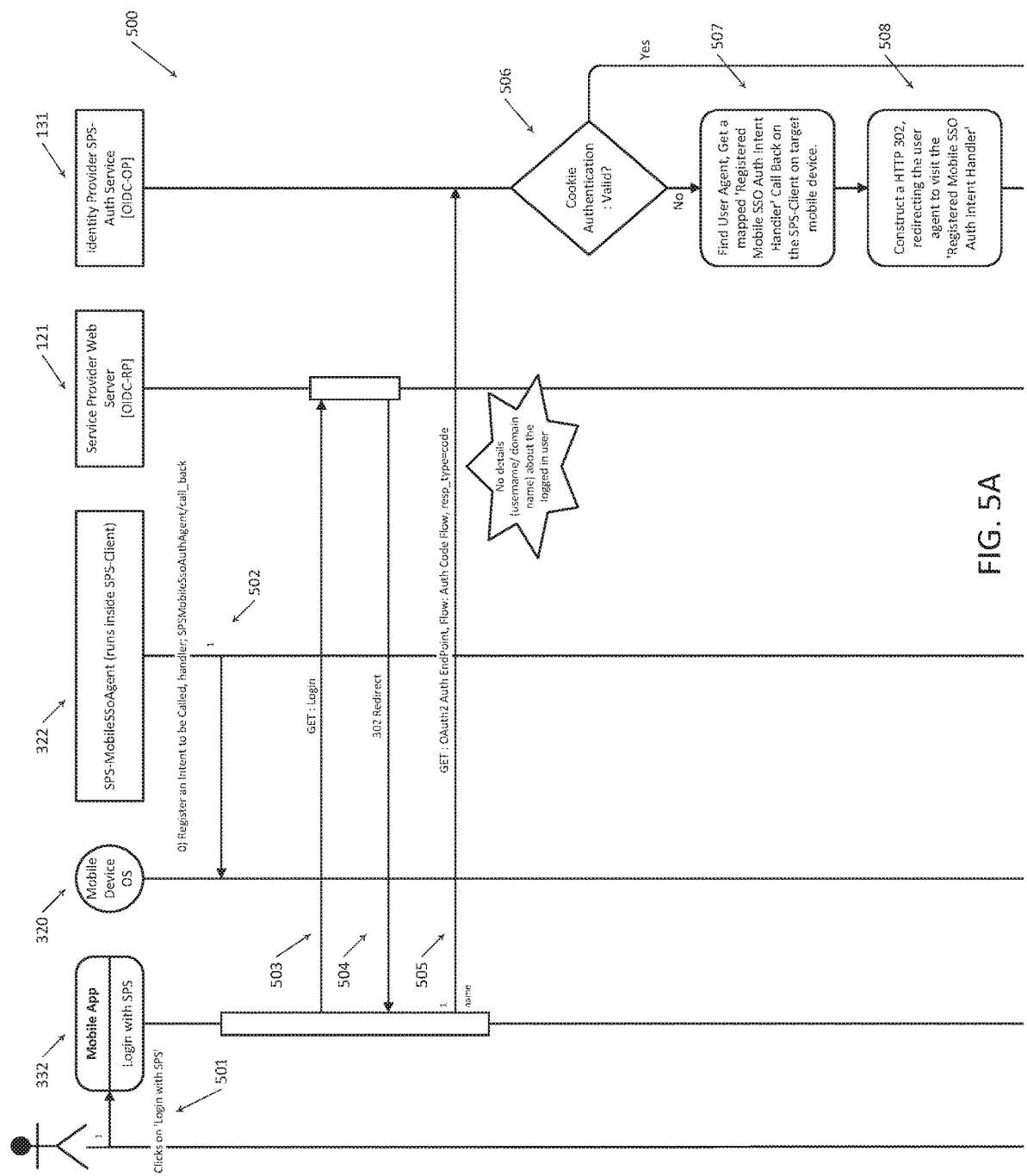
FIGS. 5A and 5B are flow charts illustrating flow for a native mobile application that supports SSO login through OIDC.
Figure 5B:
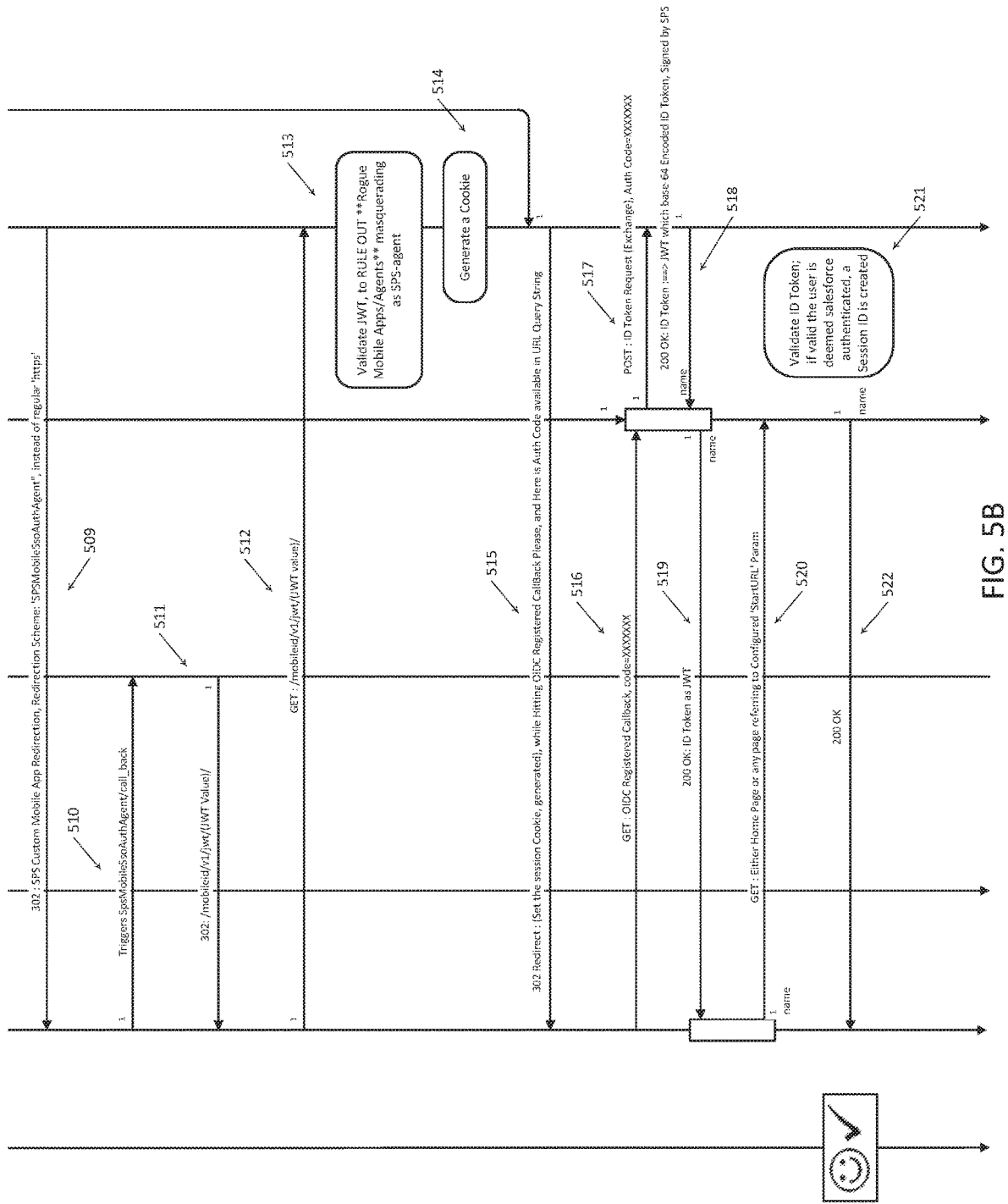

FIGS. 5A and 5B are flow charts 500 illustrating flow for a native mobile application that supports SSO login through OIDC. As shown in FIGS. 5A and 5B, in step 501, a user with a mobile device (for example, a smart phone) 112 clicks on the mobile application icon "App A" 332 on the user interface (or graphical user interface (GUI). Once the icon "App A" 332 has been opened, the user selects the "Use SSO" icon on the graphical user interface as shown in FIG. 4B. As shown in FIG. 4B, the user then enters an e-mail or domain and logs in with "Login with SPS". In step 502, the SPS-MobileSSO Agent (running on the SPS-Client) registers an intent to be called, (e.g., handler: SpsMobile SsoAuthAgent;/call_back) with the operating system (OS) of the mobile device 112.

In step 503, the mobile application sends a login request (e.g., "GET:Login") to the service provider web server (OIDC-RP) 121. In step 504, the service provider web server (OIDC-RP) 121 sends a URL redirect response (e.g., 302 Redirect (e.g., URL redirection)) to the mobile application 332. In step 505, the mobile application 332 sends an authentication request (e.g., "GET: OAuth2 Auth EndPoint, Flow: Auth Code Flow, resp_type=code") to the Identity Provider, for example, SPS-Auth Service (OIDC-OP) 131. In accordance with an exemplary embodiment, in step 505, the authentication request does not include any details (for example, username/domain name) about the logged in user. In step 506, the OIDC-OP checks the authentication request from the mobile application in step 505 to determine if cookie authentication is present (e.g., is the cookie authentication valid). If the cookie authentication is valid (i.e., the authentication cookie is present), the process continues to step 515. However, if the cookie authentication is not valid (i.e., the authentication cookie is not present) in step 506, the process continues to step 507, where the OIDC-OP 131 finds User Agent, Get a mapped "Registered Mobile SSO Auth Intent Handler" Call Back on the SPS-Client on the target mobile device.

In step 508, the OIDC-OP 131 constructs a URL redirection request (e.g., HTTP 302) redirecting the user agent to visit the "Registered Mobile SSO Auth Intent Handler". In step 509, the OIDC-OP 131 send the URL redirection response (e.g., a 302:SPS Custom Mobile Application Redirection, Redirection Scheme: "SpsMobileSsoAuthAgent", instead of a regular "https") to the mobile application 332. In step 510, the URL redirection response (e.g., HTTP 302 request triggers SpsMobileSsoAuthAgent:/call_back) is sent to SPS-SSO agent (e.g., the SPS-MobileSsoAgent (running inside the SPS-Client)) 322. In step 511, the SPS-SSO agent sends the current active JWT (i.e., token) (e.g., 302:/mobileid/v1/jwt/(JVVT Value)) to the mobile application 332. In step 512, the current active JWT received from the SPS-SSO agent is sent with a request (e.g., GET:/mobiledi/v1/jwt/(JVVT Value)) to the OIDC-OP 131.

In step 513, the OIDC-OP 131 validates the JWT (i.e., token), for example, to rule out "Rogue Mobile Apps/Agents" masquerading as SPS-agent. In step 514, if the OIDC-OP 131 validates the JWT (i.e., token), a cookie is generated. In step 515, the OIDC-OP 131 sends a response (e.g., 302 Redirect with a generated session Cookie with "OIDC Registered CallBack Please") with the generated cookie indicating that the Authentication Code (e.g., cookie) is available in the URL Query String. The mobile application 332 receives the Authentication Code and sends in step 516 a request for services (e.g., GET:ODIC Registered Callback, code=XXXXX) to the OIDC-RP 121. In step 517, the OIDC-RP receives the request from the mobile application 332 and sends a request to the OIDC-OP 131 to authenticate the user (e.g., POST:ID Token Request (Exchange), Authentication code=XXXXX). In step 518, the OIDC-OP 131 receives the request and verifies that the user is authenticated (via the JWT (i.e., token) and corresponding cookie) and sends an OK success status response (e.g., HTTP 200 OK:ID Token→JWT which Base-64 Encoded ID Token, Signed by SPS) to the OIDC-RP 121. In step 519, the OIDC-RP 121 sends a response to the mobile application indicating that the JWT (i.e., token) was verified and that the request had succeeded (e.g., 200 OK:ID Token as JWT). In step 520, the mobile application receives the success response and sends a request to OIDC-RP 121 for an application or service, for example, "GET:Either Home Page or any page referring to Configured 'StartURL' Param. In step 521, the OIDC-RP validates the ID Token, and if the ID Token is valid, the user is deemed to be authenticated and a session identifier (ID) is created. In step 522, a success response (e.g., 200 OK response) is sent to the mobile application 332.

Figure 6A:
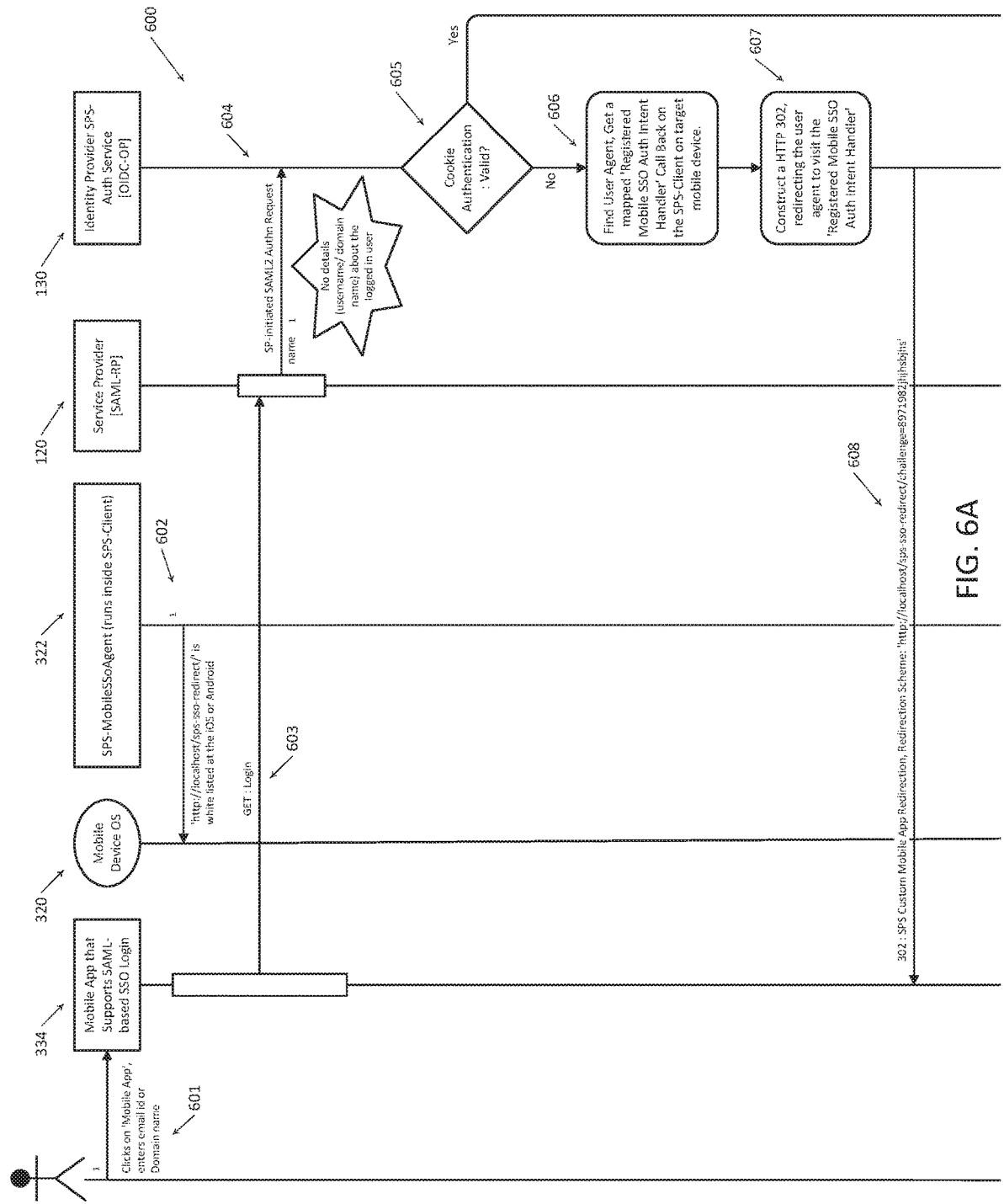
FIGS. 6A and 6B are flow charts illustrating flow for a native mobile application that supports SSO login through SAML.
Figure 6B:
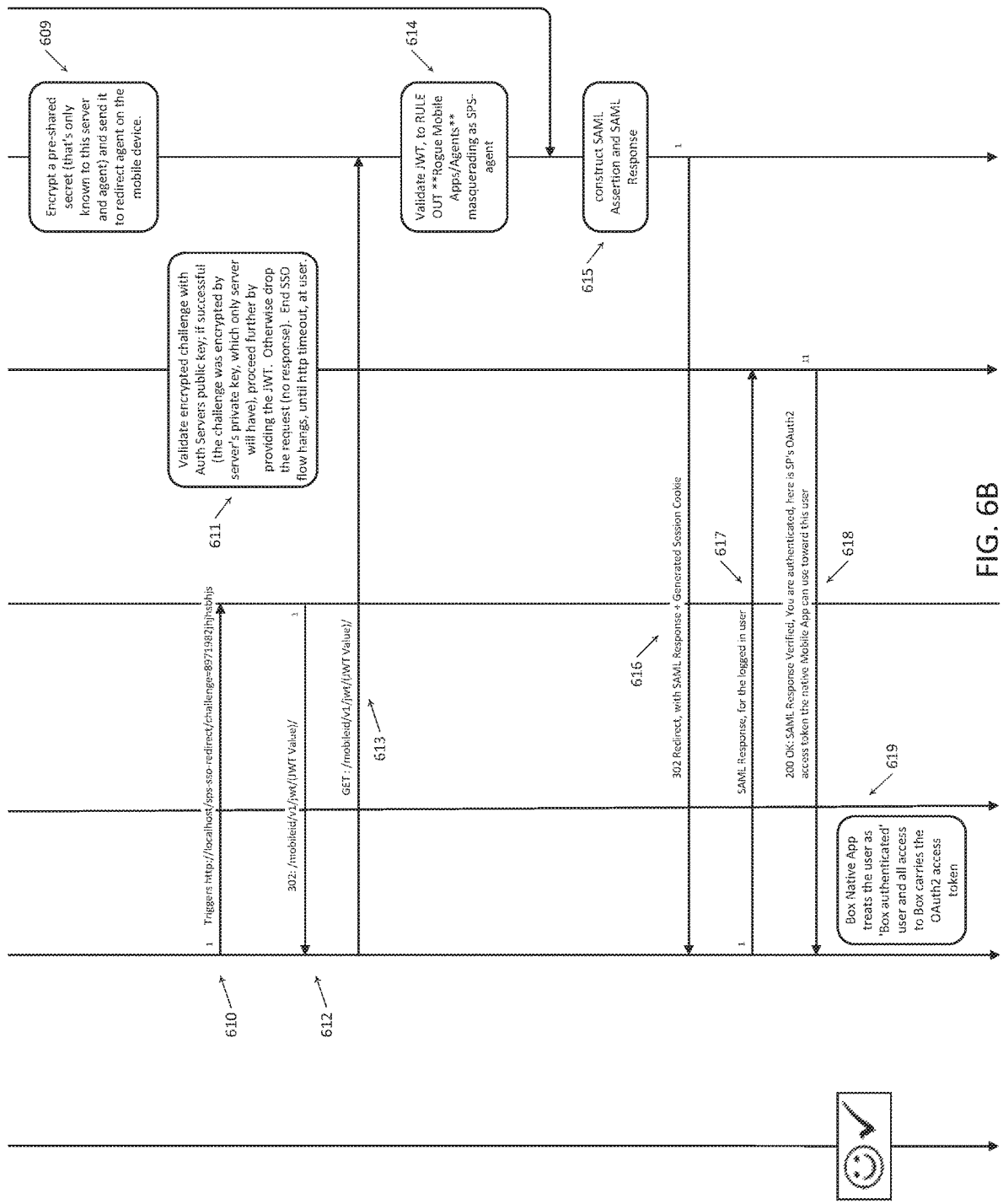

FIGS. 6A and 6B are flow charts 600 illustrating flow for a native mobile application that supports SSO login through SAML. As shown in FIGS. 6A and 6B, in step 601, a user with a mobile device (for example, a smart phone) 112 clicks on the mobile application icon "App B" 334 on the user interface (or graphical user interface (GUI). Once the icon "App B" 334 has been opened, the user enters email ID and/or domain name on the graphical user interface as shown in FIG. 4B. In step 602, the SPS-MobileSSO Agent (running on the SPS-Client) 320 registers http://localhoste/sps-sso-redirect/" (i.e. white listed) on the IOS or Android (OS) of the mobile device 112.

In step 603, the mobile application 334 sends a request (e.g., "GET:Login") to the Service Provider Web Server (SAML-SP) 120. In step 604, in response to the request from the mobile application 334, the Service Provider Web Server (SAML-SP) 120 sends an authentication request, for example, a SP-initiated SAML2 Authentication Request, to the SPS-Authentication Service (SAML-IdP) 130. The authentication request (e.g., SP-initiated SAML2 Authentication Request) to the SPS-Authentication Service (SAML-IDP) 130 does not include any details (for example, username/domain name) about the logged in user. In step 605, the authentication request (e.g., SP-initiated SAML2 Authentication Request) is received by the SPS-Authentication Service (SAML-IDP) 130 and determines if the cookie authentication is valid. If the cookie authentication is valid, the process continues to step 615. However, if the cookie authentication is not valid, the process continues to step 606, where the SAML-IDP 130 located (or finds) the user agent, and maps the "Registered Mobile SSO Authentication Intent Handler" Call Back on the SPS-Client on target mobile device. In step 607, the SAML-IdP 130 constructs a URL redirection request (e.g., "Construct a HTTP 302, redirecting the user agent to visit the "Registered Mobile SSO Auth Intent Handler"). In step 608, the SAML-IdP 130 sends the URL redirection request (e.g., "302:SPS Custom Mobile App Redirection, Redirection Scheme: http://localhost/sps-sso-redirect/challenge=8971982jhjhsbjhs) to the mobile application 334, which includes an encrypted message as generated in step 609. As shown in FIG. 6A, in step 609, the SAML-IdP 130 "encrypt a pre-shared secret (that's only known to this server and agent) and sends the response to redirect the agent on the mobile device 112.

In step 610, the mobile application 334 sends a request (e.g., "Triggers http://localhost/sps-sso-redirect/ challenge=897198jhjhsbjhs") to the SPS-SSO agent 322 for validation in step 611 of the private key provided by the SAML-IdP 130 (e.g., "Validate encrypted challenge with Auth Servers public key, if successful (the challenge was encrypted by server's private key, which only server will have), proceed further by providing the JWT. Otherwise drop the request (e.g., no response) End SSO flow hangs, until http timeout, at user).

In step 612, the SPS-SSO agent 322 sends a URL redirection response to the mobile application 334 with the JWT (token) (e.g., "302/mobileid/v1/jwt (JWT Value)/"). In step 613, the mobile application 334 sends a request to the SAML-IdP 130 requesting validation of the JWT (token) (e.g., "GET:/mobileid/v1/jwt/(JWT value)/). In step 614, the SAML-IdP 130 receives the request from the mobile application and validates the JWT (token) (e.g., "Validated JWT to Rule Out, for example, Rogue Mobile Apps/Agents masquerading as SPS-agent). In step 615, if the JWT (token) is valid, the SAML-IDP 130 constructs an SAML Assertion and SAML response. In step 616, the SAML-IDP 130 sends a URL redirection response to the mobile application 334 (e.g., "302 Redirect, with SAML Response and Generated Session Cookie"). In step 617, the mobile application receives the SAML response and sends the SAML Response, for the logged in user, to the Service Provider (SAML-SP) 120. In step 618, the SAML-SP 120 sends a success response to the mobile application 334 indicating that the logged in user has been authenticated (e.g., "200 OK:SAML Response Verified, User is Authenticated, SP's Oauth2 access toke the native Mobile Application can use towards the user). In step 619, the user of the mobile application (i.e. Box Native Application) is treated as a "box-authenticated" user and all access to the services on the SAML-SP 120 carries the Oauth2 access token.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing a resource hosted on a relying party server from a mobile device, the method comprising:
    hosting, on the mobile device, a native application, the mobile device including a user agent for pre-authenticated users;
    receiving, on the native application on the mobile device, a redirection request from an authentication server for an authentication token for a pre-authenticated user in response to a request for the resource hosted on the relying party server;
    sending, from the user agent on the mobile device, the authentication token for the pre-authenticated user to the authentication server in response to the redirection request form the authentication server;
    receiving, on the native application on the mobile device, an authentication cookie for the authenticated user to access the resource on the relying party server, the authentication cookie being received in response to the authentication server authenticating the authentication token received from the user agent of the mobile device;
    sending, by the native application on the mobile device, the authentication cookie to the relying party server; and
    accessing, by the native application on the mobile device, the resource hosted on the relying party server.

2. The method according to claim 1, further comprising:
    authenticating the pre-authenticated user on the mobile device via a single sign-on (SSO) method.

3. The method according to claim 2, further comprising:
    upon authentication of the pre-authenticated user, registering an intent to be called for the pre-authenticated user with an operating system (OS) of the mobile device, the intent to be called configured to respond to the redirection request from the authentication server with the authentication token for the pre-authenticated user from the user agent of the mobile device upon receipt.

4. The method according to claim 1, wherein the authentication server is an OpenID Connect (OIDC) provider or a Security Assertion Markup Language (SAML) Identity Provider, and the relying party server is an OIDC Relying Party or a SAML Service Provider.

5. The method according to claim 1, wherein the authentication token is a JSON Web Token (JWT).

6. The method according to claim 1, wherein an operating system of the mobile device continuously waits for the redirection request from the authentication server with the authentication token for the pre-authenticated user from the user agent of the mobile device to avoid loss of flow of the request for the resource hosted on the relying party server.

7. The method according to claim 6, wherein the redirection request from the authentication server via the user agent is configured to operate concurrently with requests for resources hosted on the relying party server via a Web Browser on the mobile device.

8. The method according to claim 1, further comprising:
    sending, from the native application on the mobile device, a request to the relying party server for the resource hosted on the relying party server;
    receiving, on the native application on the mobile device, a redirection request from the relying party server;

sending, by the native application on the mobile device, a request without details on the pre-authenticated user to the authentication server; and receiving, on the native application on the mobile device, the redirection request from the authentication server for the authentication token for the pre-authenticated user in response to the request for the resource hosted on the relying party server.

9. The method according to claim 1, further comprising:
configuring the native application on the mobile device to authenticate the user for the resources hosted by the relying party server, the resources hosted by the replying party server being on-premises services or cloud services.

10. The method according to claim 1, wherein the redirection request from the authentication server for the authentication token for the pre-authenticated user is constructed by the authentication server to find the user agent and to obtain the authentication token of the pre-authenticated user.

11. The method according to claim 1, further comprising:
querying the user agent only when the authentication server detects that the user agent is from a supported mobile user agent.

12. The method according to claim 11, wherein the supported mobile user agent is one or more of the following: AppleWebKit, Mobile Safari, or 537.36 Chrome.

13. The method according to claim 1, wherein the relying party server is a telecommunication service provider (TSP), an application service provider (ASP), a storage service provider (SSP) and/or an internet service provider (ISP).

14. The method according to claim 1, wherein once the pre-authenticated user has been granted access to the resource hosted on the relying party server no further login is required.

15. A non-transitory computer readable medium storing computer readable program code executed by a processor for accessing a resource hosted on a relying party server from a mobile device, the process comprising:

hosting, on the mobile device, a native application, the mobile device including a user agent for pre-authenticated users;

receiving, on the native application on the mobile device, a redirection request from an authentication server for an authentication token for a pre-authenticated user in response to a request for the resource hosted on the relying party server;

sending, from the user agent on the mobile device, the authentication token for the pre-authenticated user to the authentication server in response to the redirection request form the authentication server;

receiving, on the native application on the mobile device, an authentication cookie for the authenticated user to access the resource on the relying party server, the authentication cookie being received in response to the authentication server authenticating the authentication token received from the user agent of the mobile device;

sending, by the native application on the mobile device, the authentication cookie to the relying party server; and accessing, by the native application on the mobile device, the resource hosted on the relying party server.

16. The non-transitory computer readable medium according to claim 15, further comprising:
authenticating the pre-authenticated user on the mobile device via a single sign-on (SSO) method.

17. The non-transitory computer readable medium according to claim 16, further comprising:
upon authentication of the pre-authenticated user, registering an intent to be called for the pre-authenticated user with an operating system (OS) of the mobile device, the intent to be called configured to respond to the redirection request from the authentication server with the authentication token for the pre-authenticated user from the user agent of the mobile device upon receipt.

18. The non-transitory computer readable medium according to claim 15, wherein the authentication server is an OpenID Connect (OIDC) provider or a Security Assertion Markup Language (SAML) Identity Provider, and the relying party server is an OIDC Relying Party or a SAML Service Provider; and the authentication token is a JSON Web Token (JWT).

19. A mobile device having a native application for accessing a resource hosted on a relying party server from the mobile device, the mobile device comprising:

a processor;

a user interface; and a memory having an operating system, a user agent having authentication tokens for pre-authenticated users, and the native application, the operating system, the user agent, and the native application configured to:

receive a redirection request from an authentication server for an authentication token for a pre-authenticated user in response to a request for the resource hosted on the relying party server;

send the authentication token for the pre-authenticated user from the user agent of the mobile device to the authentication server in response to the redirection request form the authentication server;

receive an authentication cookie generated from the authentication of the authentication token from the user agent on the authentication server, the authentication cookie configured to grant the authenticated user access to the resource on the relying party server; and access the resource hosted on the relying party server with the authentication cookie.

20. The mobile device according to claim 19, wherein the pre-authenticated user is authenticated on the mobile device via a single sign-on (SSO) method, and upon authentication of the pre-authenticated user, the user agent is configured to register an intent to be called for the pre-authenticated user with the operating system of the mobile device, the intent to be called configured to respond to the redirection request from the authentication server with the authentication token for the pre-authenticated user from the user agent of the mobile device upon receipt; and wherein the authentication server is an OpenID Connect (OIDC) provider or a Security Assertion Markup Language (SAML) Identity Provider, and the relying party server is an OIDC Relying Party or a SAML Service Provider, and the authentication token is a JSON Web Token (JWT).

* * * * *